(No Model.) C. WESTALL. 2 Sheets—Sheet 1.
PERMUTATION LOCK.
No. 549,759. Patented Nov. 12, 1895.
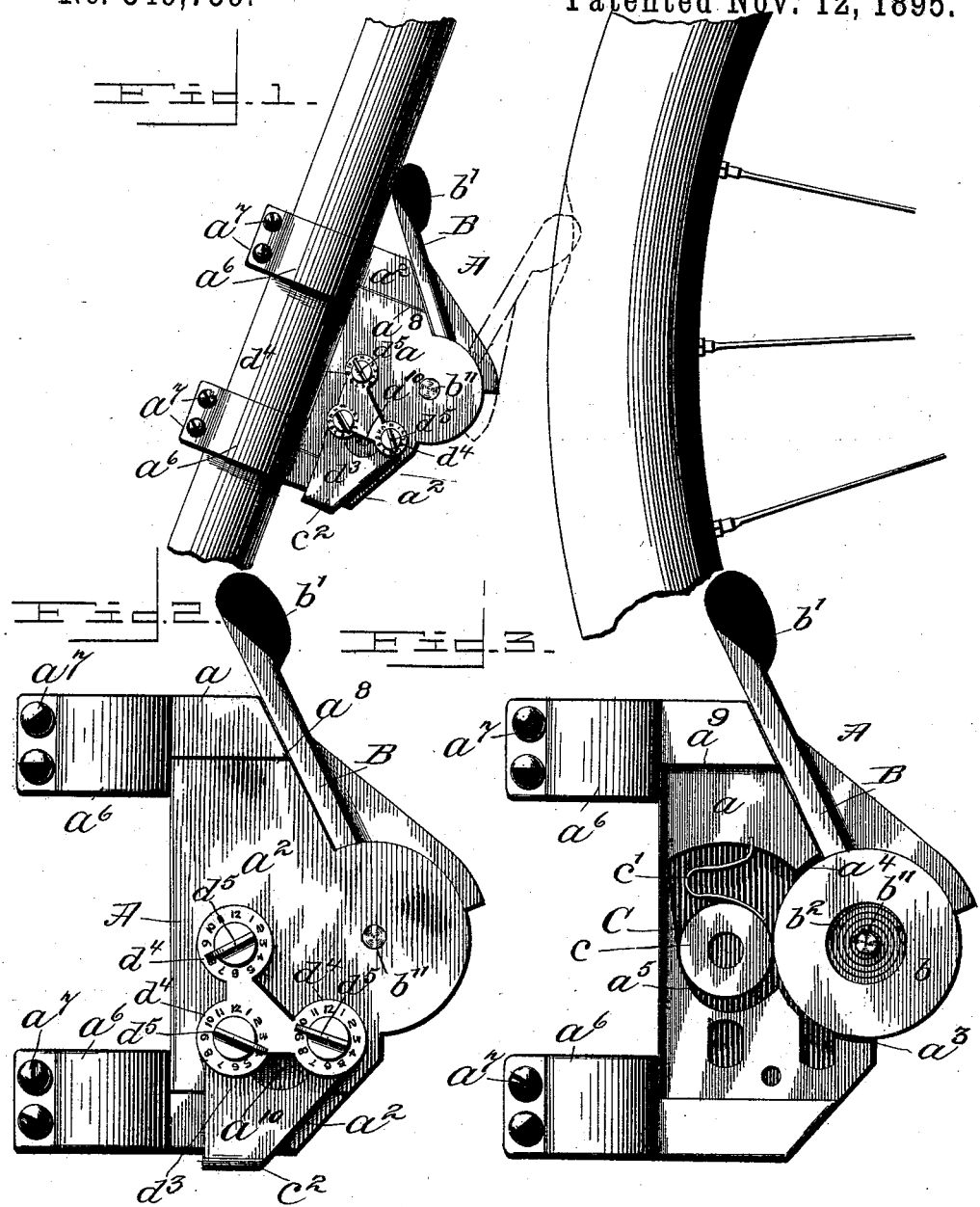
Witnesses
W. H. Humphrey.
Horace G. Dietz.
Inventor,
Charles Westall,
by Geo. H. Holgate.
his Attorney

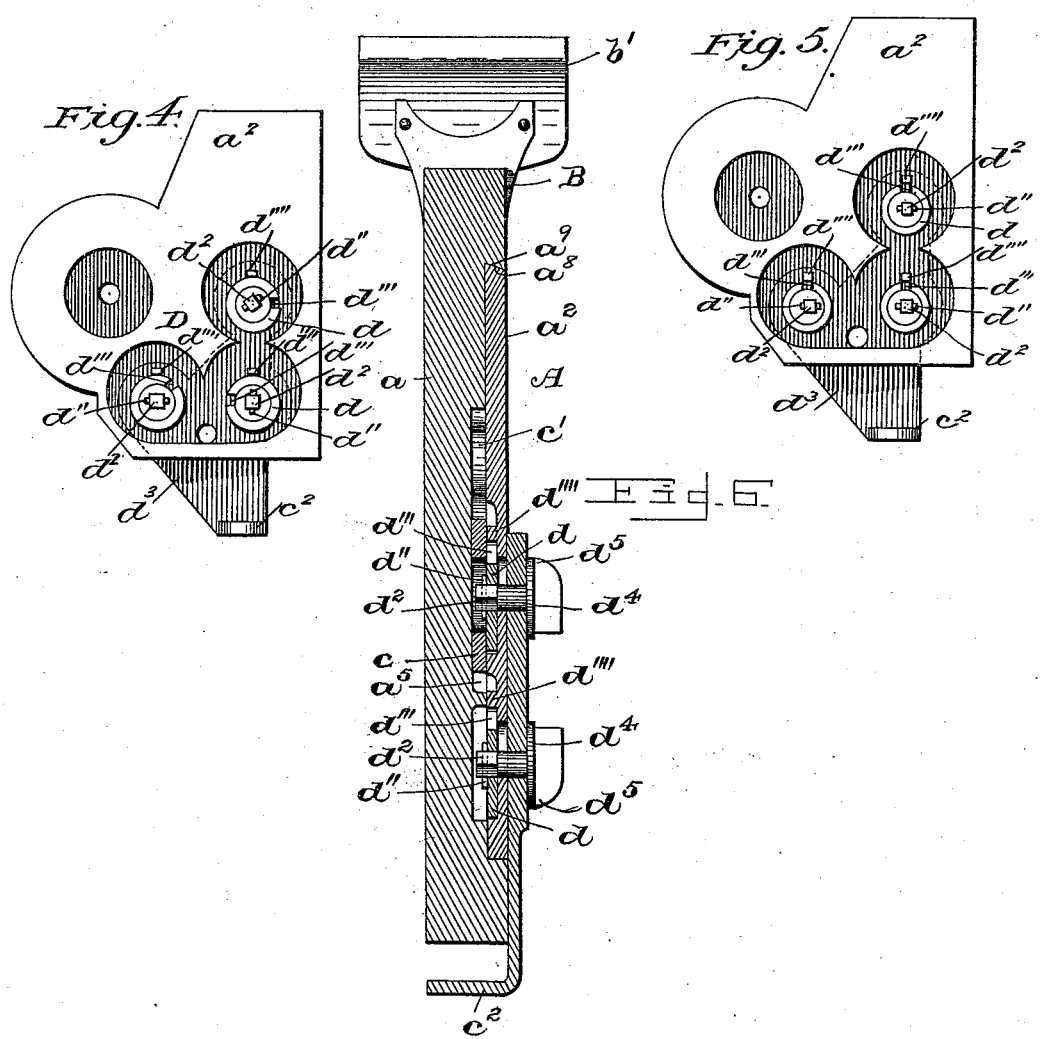

UNITED STATES PATENT OFFICE.

CHARLES WESTALL, OF MIDDLEBURY, VERMONT.

PERMUTATION-LOCK.

SPECIFICATION forming part of Letters Patent No. 549,759, dated November 12, 1895.

Application filed August 25, 1894. Serial No. 521,353. (No model.)

*To all whom it may concern:*

Be it known that I, CHARLES WESTALL, a citizen of the United States, residing at Middlebury, in the county of Addison and State of Vermont, have invented certain new and useful Improvements in Permutation-Locks, of which the following is a specification.

This invention relates to permutation-locks.

The object of the invention is to produce a wheel-lock designed to be secured to and carried upon a bicycle or other vehicle, by which, when properly adjusted, rotation of the wheel will be rendered impossible and the safety of the vehicle against being stolen thereby insured, and, further, to employ a light, compact construction, and simple and effective combination mechanism controlling the same.

With these objects in view the invention consists, essentially, in a casing, a wheel-engaging bar having a limited movement about a pivotal center, and a friction-ring seated in an angular recess of the casing and held by a spring engaging the bar in a manner whereby the bar will move freely in one direction and be locked against movement in the opposite direction; furthermore, in a casing, a wheel-engaging bar having a limited movement about a pivotal center and provided with a disk-like enlargement and a friction-ring seated in an angular recess of the casing and held by a spring engaging the periphery of the disk-like enlargement of the bar, whereby the bar will rotate freely in one direction and be locked against rotation in the opposite direction; furthermore, in a casing, a wheel-engaging bar pivoted at one of its ends and having a limited movement about its pivotal center, the end adjacent the pivot being enlarged or disk like, and a friction-ring seated in an angular recess of the casing and held by a spring engaging the periphery of the enlarged end of the bar, and combination mechanism by which the ring may be disengaged to release the bar; furthermore, in a casing, a spring-actuated wheel-engaging bar provided with a disk-like extremity and having a limited movement about a pivotal center concentric with the disk, a friction-ring seated in an angular recess of the casing and held by a spring engaging the periphery of the disk-like extremity of the bar, and combination mechanism controlling the friction-ring; furthermore, in a lock comprising a casing, a wheel-engaging bar provided with a disk-like extremity and having a limited movement about a pivotal center concentric with the disk, the outer end of the bar being padded for engagement with the wheel, a friction-ring seated in an angular recess of the casing and held by a spring engaging the periphery of the disk-like extremity of the bar, whereby the bar will move freely in one direction and be locked against movement in the opposite direction, and combination mechanism controlling the friction-ring; furthermore, in a wheel-lock comprising a casing secured adjacent to the periphery of the wheel, a tire-engaging bar projecting from the casing and mounted therein to have a limited movement about a pivotal center, means for retaining the bar locked against the periphery of the wheel, and combination mechanism controlling the release of the bar, and, finally, in details of construction.

The invention is illustrated in the accompanying drawings, forming part of this specification, in which like letters of reference indicate corresponding parts in the several views.

Figure 1 is a view in elevation of one embodiment of the invention applied, showing portions of the rear wheel and frame of a bicycle, the lock detachably secured upon the frame forward of the wheel by separable heads and connecting-bolts, and by full lines the tire-engaging bar projecting from the casing out of engagement with the wheel; also, by dotted lines its position locked in engagement therewith. Fig. 2 is a view in elevation, on an enlarged scale, of the lock detached, showing a casing having an upper detachable face-plate and separable heads at its opposite ends, by which it may be attached to the frame of a bicycle or other vehicle, the tire-engaging bar projecting from the casing and movable about a pivotal center, its forward movement being limited by a stop formed thereon designed to abut against the shoulder of the casing and its backward movement by the casing proper, and the combination or permutation disks, three in number, connected to be shifted simultaneously by a thumb-piece to release the bar. Fig. 3 is a view in elevation of the lock with the face-plate of the casing removed, showing the tire-engaging bar provided at one end with a disk-like enlargement and pivoted to move about a center concentric with the enlargement, an actuating-spring coiled upon and having one end secured to the pivot-pin and its opposite end to the bar, a stop upon the bar designed to abut against a shoulder of the casing to limit its forward movement, a cushion or pad at the outer end of the bar suitably shaped to engage the tire of a wheel, an angular recess in the casing adjacent the extremity of the bar, and a toothed friction-ring seated in the recess and held by a spring engaging the periphery of the disk-like extremity of the bar. Figs. 4 and 5 are both plan views of the combination or permutation mechanism which controls the movement of the thumb-piece $c^2$ and the dial-plate which in turn imparts the motion to the friction-ring C, which disengages it from the periphery of the locking-bar disk B. Fig. 6 is a sectional view of the lock through the center of the two interior dial-plates, showing the interior of the combination-lock.

In all the figures like letters indicate like parts.

In the drawings, A represents a lock the casing $a$ of which is provided with a removable face-plate $a^2$, and is recessed adjacent an integral lip or extension $a^3$ to form an approximately-semicircular seat $a^4$. At one side and opening into this recess is an angular cavity $a^5$. As a means of attaching the lock the casing is provided with separable heads $a^6$, which, if desired, may be of spring metal, and are rigidly held upon the frame of a bicycle by bolts $a^7$. The edge $a^8$ of the face-plate of the casing is beveled or ribbed to enter a face or undercut groove $a^9$ of the casing and is secured by a single screw $a^{10}$ passing through an opening in the face-plate and threaded into the casing.

B represents a wheel-engaging bar, which is provided at one end with a disk-like extremity $b$, mounted in a semicircular recess of the casing, so as to move about a pivotal center between suitably-arranged stop-shoulders of the casing, the center being concentric with the disk, which is inclosed at its sides between the semicircular lips or extensions of the casing and face-plate. The outer end of the bar is provided with an elastic cushion $b'$, preferably of rubber, so that the resulting wear upon the tires of a bicycle from frequent engagement therewith will be inappreciable, and the tires thereby protected. Encircling and attached at one end to a pivotal pin $b''$, about which the bar turns, is a retractile spring $b^2$, having its opposite end secured to the bar, which acts upon the release of the bar to force it out of engagement with the wheel, retaining it in the position shown in Figs. 2 and 3 of the drawings.

C represents the locking mechanism proper, which comprises a friction-ring $c$, preferably of steel, having a milled or roughened periphery, the ring being seated in the angular recess of the casing and held by a spring $c'$, engaging the periphery of the disk-like extremity of the bar. By this construction it will be apparent that the bar may be readily moved forward into a locked position against the action of its spring and without resistance from the ring, the ring being thereby forced toward the larger end of the recess. When, however, the movement of the bar is reversed, the toothed ring will be forced in the opposite direction, or toward the smaller end of the angular recess, thereby becoming wedged between the wall of the recess and the periphery of the disk-like extremity of the bar, and continued or increased pressure upon the bar in this direction will serve only to increase the resistance by wedging the locking-ring more firmly against the bar. To effect a disengagement of the ring when in this position, a thumb-piece $c^2$ is employed and slidingly mounted upon the face-plate of the casing, the movement of the plate being controlled by combination or permutation mechanism.

D represents this mechanism, the disks $d$ of which are seated in recesses in the under side of the face-plate and removably held upon the squared ends of spindles $d^2$, which project through slots in the plate, by pins $d''$ or in any other suitable manner, and are provided, respectively, with one or more peripheral notches $d'''$, which when the combination is properly set up become aligned with stop-pins $d''''$, and upon depressing the thumb-piece the disks are simultaneously adjusted by reason of their spindles being journaled in to move with the dial-plate of which, the thumb-piece forms part. Upon the ends of the spindles projecting through this plate nuts or heads $d^4$ are fixed and are provided with index fingers or pointers $d^5$, which travel over the dial-plates. The spindle of the permutation-disk adjacent the friction-ring is given an increased length at its inner end and enters the opening in the ring, so that upon depressing the thumb-piece of the dial-plate motion will be imparted to the ring, forcing it toward the larger end of the angular recess out of engagement with the periphery of the locking-bar disk, the bar being immediately released and thrown back by the action of its spring. To change the combination, it is only necessary to remove one of the pins which hold the disks upon the spindles, remove the disk and replace it, after giving it a quarter-turn or more, thereby causing its notch to require a different adjustment before becoming aligned with the stop-pin. As shown in Fig. 4 of the drawings, when these notches are out of alignment the pins engage the peripheries of the disk, holding them against play or being moved by the thumb-piece of the sliding plate.

The advantages of this invention lie in its extreme simplicity and effectiveness, which, together with its light, compact, and strong construction, tend to make it superior to all prior constructions.

Having thus described my invention, what I claim as new, and desire to secure by Letters Patent, is—

1. A locking bar, having a limited movement about a pivotal center, and a friction ring, seated in an angular recess, in a manner, to normally engage the bar, whereby, the bar will move freely in one direction and be locked against movement in the opposite direction, as specified.

2. A locking bar, having a limited movement about a pivotal center and provided with a disk-like enlargement, and a friction ring, seated in an angular recess and held by a spring, engaging the periphery of the disk-like enlargement of the bar, whereby the bar will freely rotate in one direction and be locked against rotation in the opposite direction, as specified.

3. A locking bar, pivoted at one of its ends and having a limited movement about its pivotal center, and a friction ring seated in an angular recess and held, by a spring, engaging the bar, and combination mechanism, controlling the ring, whereby it may be disengaged, to release the bar, as specified.

4. A spring actuated locking bar, provided with a disk-like extremity and having a limited movement about a pivotal center concentric with this disk, a friction ring, seated in an angular recess, and held by a spring, engaging the periphery of the disk-like extremity of the bar, and combination mechanism controlling the friction ring, as specified.

5. A lock, comprising a casing, a locking bar, provided with a disk-like extremity and having a limited movement about a pivotal center concentric with the disk, the outer end of the bar being padded for engagement with the wheel, a friction ring, seated in an angular recess of the casing and held, by a spring, engaging the periphery of the disk-like extremity of the bar, whereby the bar will move freely in one direction and be locked against movement in the opposite direction, and combination mechanism controlling the friction ring, as specified.

6. A wheel lock, comprising a casing secured adjacent the periphery of the wheel, a tire engaging bar projecting from the casing and mounted therein, to have a limited movement about a pivotal center, means for retaining the bar locked against the periphery of the wheel, and combination mechanism controlling the release of the bar, as specified.

In testimony whereof I have hereunto affixed my signature in the presence of two subscribing witnesses.

CHARLES WESTALL.

Witnesses:
W. H. SHELDON,
H. W. HAMMOND.